(12) United States Patent
Lin

(10) Patent No.: US 7,673,925 B2
(45) Date of Patent: Mar. 9, 2010

(54) DRIVE MOTOR ASSEMBLY FOR A VEHICLE SUNSHADE ASSEMBLY

(75) Inventor: Paul Lin, Tainan Hsien (TW)

(73) Assignee: Macauto Industrial Co., Ltd. (TW)

( * ) Notice: Subject to any disclaimer, the term of this patent is extended or adjusted under 35 U.S.C. 154(b) by 0 days.

(21) Appl. No.: 12/171,772

(22) Filed: Jul. 11, 2008

(65) Prior Publication Data

US 2010/0007168 A1    Jan. 14, 2010

(51) Int. Cl.
*B60J 3/00* (2006.01)
(52) U.S. Cl. .................................. 296/97.4; 296/97.8
(58) Field of Classification Search ............... 296/97.4, 296/97.8
See application file for complete search history.

(56) References Cited

U.S. PATENT DOCUMENTS

| | | | | |
|---|---|---|---|---|
| 5,638,884 A | * | 6/1997 | Lin ....................... | 160/370.22 |
| 5,738,173 A | * | 4/1998 | Burge et al. ............ | 166/385 |
| 5,823,267 A | * | 10/1998 | Burge et al. ............ | 166/385 |
| 6,189,948 B1 | * | 2/2001 | Lin ......................... | 296/97.4 |
| 6,216,762 B1 | * | 4/2001 | Lin ..................... | 160/370.22 |
| 6,536,829 B2 | * | 3/2003 | Schlecht et al. ......... | 296/97.4 |
| 6,557,616 B2 | * | 5/2003 | Schlect ................... | 296/97.8 |
| 6,834,705 B2 | * | 12/2004 | Seel ........................ | 296/97.8 |
| 6,910,518 B2 | * | 6/2005 | Zimmermann et al. ..... | 296/97.7 |
| 7,314,079 B2 | * | 1/2008 | Yano et al. ............... | 296/141 |
| 2008/0006373 A1 | * | 1/2008 | Lin ......................... | 160/321 |

\* cited by examiner

*Primary Examiner*—Kiran B. Patel
(74) *Attorney, Agent, or Firm*—Bliss McGlynn, P.C.

(57) ABSTRACT

A drive motor assembly for a vehicle sunshade assembly includes a motor and a stabilizing unit. The motor has a housing, and an axle extending through the housing and having two ends respectively protruding outwardly of the housing. The stabilizing unit is connected to and provides an urging force to one of the ends of the axle in an axial direction thereof toward the housing.

7 Claims, 3 Drawing Sheets

DRIVE MOTOR ASSEMBLY FOR A VEHICLE SUNSHADE ASSEMBLY

BACKGROUND OF THE INVENTION

1. Field of the Invention

The invention relates to a drive motor assembly, more particularly to a drive motor assembly for use with a vehicle sunshade assembly in order to ensure stable operation of the vehicle sunshade assembly.

2. Description of the Related Art

A conventional electric sunshade assembly mounted to a vehicle (not shown) comprises a collapsible frame assembly, a screen secured to the frame assembly, and a drive motor assembly. The drive motor assembly comprises a motor that has a rotating axle for driving the frame assembly to move the screen between covering and uncovering states.

During operation of the electric sunshade assembly, the rotating axle often experiences a reciprocating motion or oscillation from driving the frame assembly. That is, the rotating axle would vibrate and deviate from an ideal axial position relative to the motor, which results in generation of undesired noise.

SUMMARY OF THE INVENTION

It is an object of the present invention to provide a drive motor assembly that can overcome the above drawbacks of the prior art.

According to the present invention, a drive motor assembly for a sunshade assembly includes a motor and a stabilizing unit. The motor has a housing, and an axle extending through the housing and having two ends respectively protruding outwardly of the housing. The stabilizing unit is connected to and provides an urging force to one of the ends of the axle in an axial direction thereof toward the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
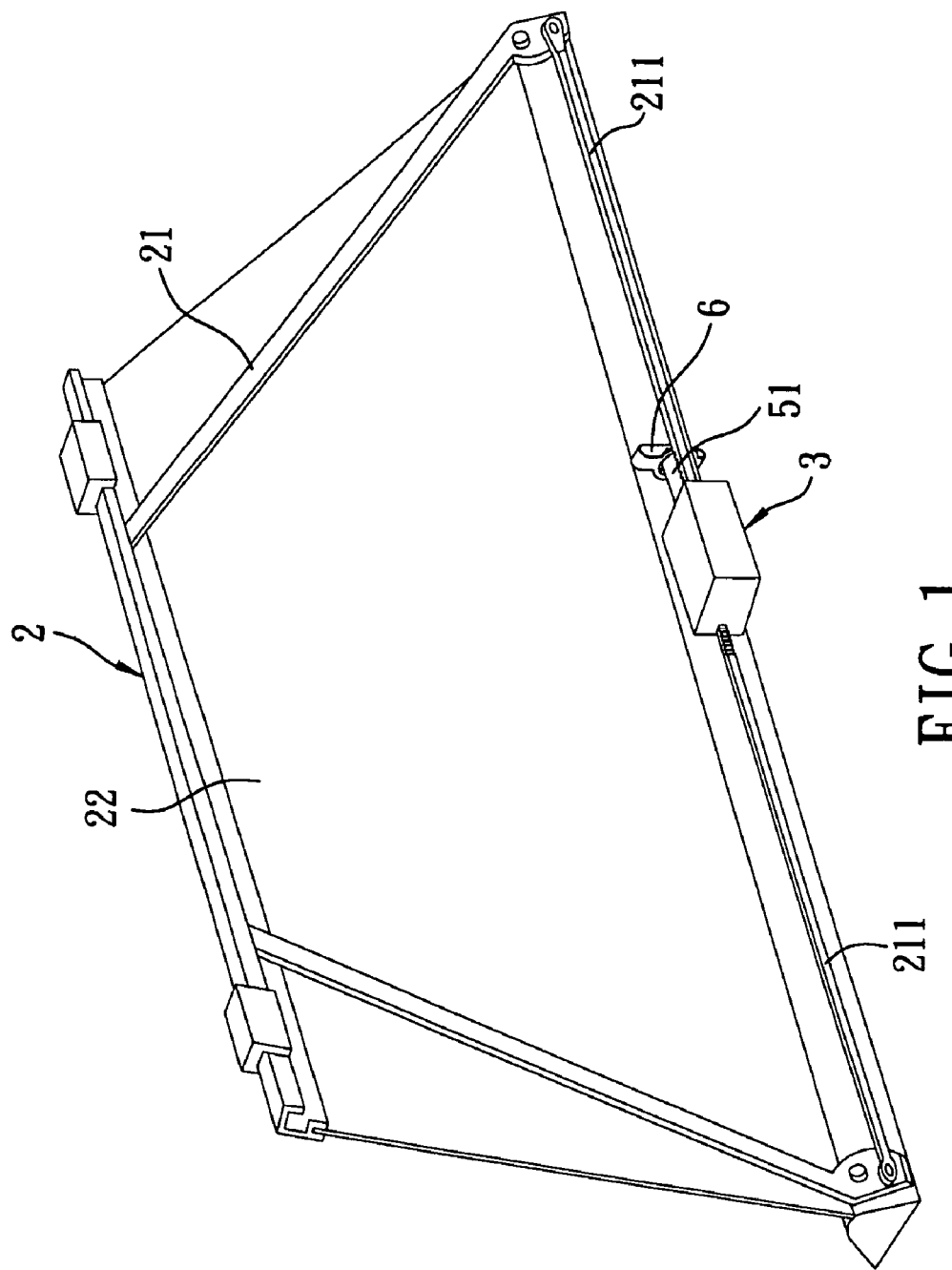
FIG. 1 is a perspective view of a vehicle sunshade assembly that incorporates the drive motor assembly of this invention.

As shown in FIG. 1, the preferred embodiment of a drive motor assembly 3 of the present invention is adapted to be assembled on a conventional vehicle sunshade assembly 2. The sunshade assembly 2 includes a collapsible frame assembly 21, and a screen 22 secured to the frame assembly 21 and movable between covering and uncovering states. The frame assembly 21 has a pair of racks 211 coupled to the drive motor assembly 3.

Figure 2:
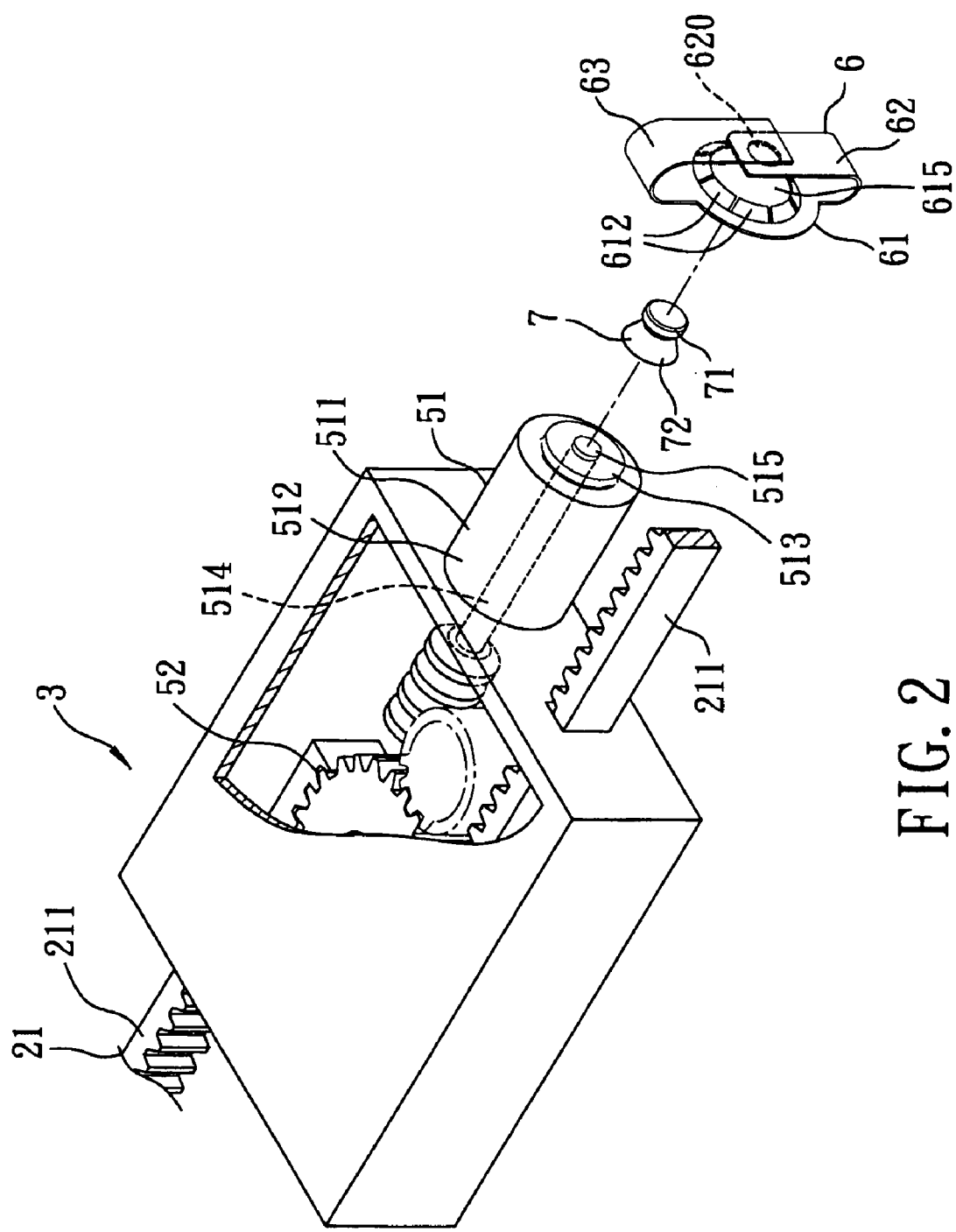
FIG. 2 is a partly exploded perspective view of a drive motor assembly according to the present invention.
Figure 3:
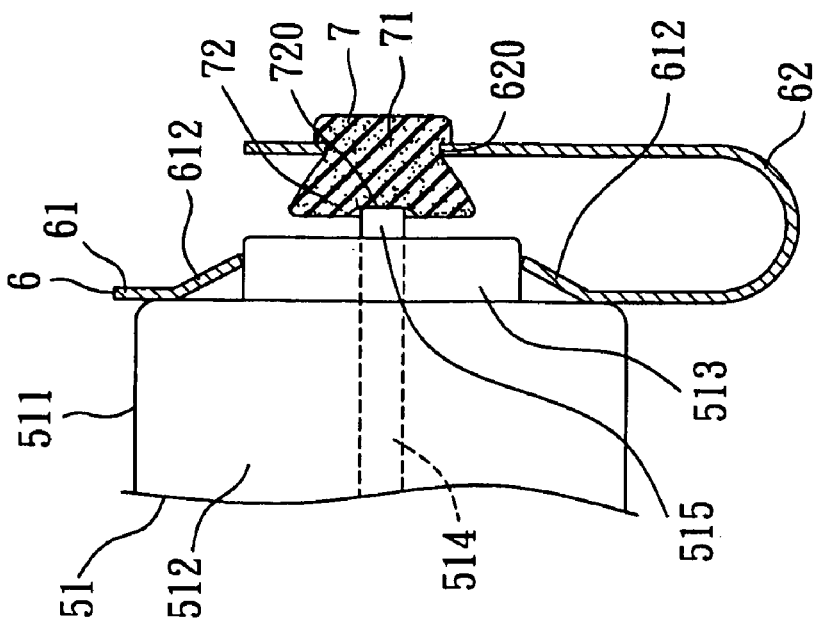
FIG. 3 is a fragmentary sectional view of the preferred embodiment, illustrating how an urging member and a cushion member are assembled on an axle.

As illustrated in FIGS. 2 and 3, the drive motor assembly 3 includes a motor 51, and a stabilizing unit. The motor 51 includes a housing 511, and an axle 514 extending through the housing 511 and having two ends 515 respectively protruding outwardly of the housing 511. The housing 511 is formed with a larger diameter portion 512, and a smaller diameter portion 513 extending axially from the larger diameter portion 512. The stabilizing unit is adapted to provide stability to the motor 51, and is connected to and provides an urging force to one of the ends 515 of the axle 514 in an axial direction thereof toward the housing 511. The stabilizing unit includes an urging member 6 and a cushion member 7. The urging member 6 has a connecting portion 61 connected securely to the housing 511, and a first resilient portion 62 extending from the connecting portion 61 and adapted to provide an urging force to one of the ends 515 of the axle 514. The first resilient portion 62 is formed with a receiving hole 620. The cushion member 7 has a front end 72, a rear end 71 opposite to the front end 72, and a middle portion extending between the front and rear ends 72, 71 and received fittingly in the receiving hole 620. The front end 72 is formed with a recess 720 for extension of one of the ends 515 of the axle 514 therein. The cushion 7 may be made of rubber or silicone but should not be limited thereto.

The urging member 6 further includes a second resilient portion 63 extending from the connecting portion 61 and abutting against the rear end 71 of the cushion member 7 to provide an urging force to the cushion member 7 toward the housing 511 of the motor 51. The connecting portion 61 is formed with an aperture 615 and includes a plurality of flexible clamping elements 612 projecting inwardly into the aperture 615 and spaced apart from each other (i.e. a predetermined spacing is present between adjacent pairs of the clamping elements 612). The clamping elements 612 clamp onto the smaller diameter portion 513 of the housing 511.

Further, the drive motor assembly 3 includes a transmission unit 52 that is driven by the axle 514 of the motor 51 and that is coupled to the racks 211 of the frame assembly 21. By employing the motor 51 and the transmission unit 52, the racks 211 of the frame assembly 21 are driven to cause movement of the screen 22 between the covering and uncovering states. However, since the primary feature of this invention does not reside in the particular configuration of the vehicle sunshade assembly 2, further details of the same will be omitted herein for the sake of brevity. The operation of the drive motor assembly 3 will be described below.

To assemble the drive motor assembly 3, the clamping elements 612 of the urging member 6 are first clamp onto the smaller diameter portion 513 of the housing 511 such that one of the ends 515 of the axle 514 extends into the recess 720 and abuts against the cushion member 7. As a consequence, the axle 514 is prevented from reciprocating in the axial direction and from deviating from an ideal axial position relative to the motor 51.

In particular, since the end 515 of the axle 514 extends into the recess 720 of the cushion member 7, undesired axial movement and axial deviation of the axle 514 are impeded by the cushion member 7 and the urging member 6, which greatly reduces the noise that is generated during operation of the motor 51. In addition, since the cushion member 7 abuts resiliently against the axle 514, it does not have an adverse affect on rotation of the axle 514.

Figure 4:
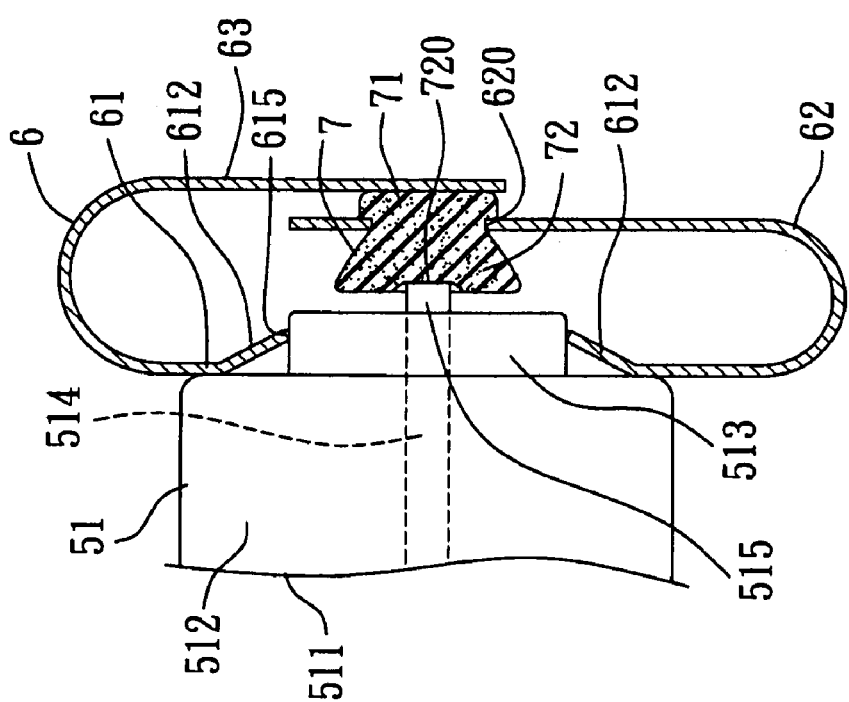
FIG. 4 shows a modified example of the preferred embodiment of the drive motor assembly of this invention.

As shown in FIG. 3, the purpose of including the second resilient portion 63 in the urging member 6 is to absorb the vibrations and oscillations produced by the axle 514 and transmitted thereto via the cushion member 7. However, in actual practice, as demonstrated by a modified example of the preferred embodiment shown in FIG. 4, the second resilient portion 63 may be omitted from the varying member 6 since the first resilient portion 62 is capable of absorbing such vibrations and oscillations.

In this embodiment, the connecting portion 61 of the urging member 6 is resiliently clamped onto the smaller diameter portion 513 of the housing 511. However, in actual practice, clamping of the connecting portion 61 onto the housing 511 should not be limited as such.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An drive motor assembly adapted to be mounted on a sunshade assembly and operable to drive the sunshade assembly between a covering state and an uncovering state, said drive motor assembly comprising:
   a motor including a housing, and an axle extending through said housing and having two ends respectively protruding outwardly of said housing; and
   a stabilizing unit connected to and providing an urging force to one of said ends of said axle in an axial direction thereof toward said housing.

2. The drive motor assembly of claim 1, wherein said stabilizing unit includes an urging member having a connecting portion connected securely to said housing, and a first resilient portion extending from said connecting portion to provide the urging force to said one of said ends of said axle.

3. The drive motor assembly of claim 2, wherein said stabilizing unit further includes a cushion member connected to said first resilient portion and abutting against said one of said ends of said axle.

4. The drive motor assembly of claim 3, wherein said first resilient portion of said urging member is formed with a receiving hole, said cushion member having a front end, a rear end opposite to said front end, and a middle portion extending between said front and rear ends and received fittingly in said receiving hole, said front end abutting against said one of said ends of said axle.

5. The drive motor assembly of claim 4, wherein said front end of said cushion member is formed with a recess for extension of said one of said ends of said axle therein.

6. The drive motor assembly of claim 4, wherein said urging member further includes a second resilient portion extending from said connecting portion and abutting against said rear end of said cushion member to provide an urging force to said cushion member toward said housing of said motor.

7. The drive motor assembly of claim 2, wherein said connecting portion is formed with an aperture and includes a plurality of flexible clamping elements projecting inwardly into said aperture and spaced apart from each other, said clamping elements clamping onto said housing of said motor.

* * * * *